US012561583B2

(12) United States Patent
Rawat et al.

(10) Patent No.: US 12,561,583 B2
(45) Date of Patent: Feb. 24, 2026

(54) SYSTEMS AND METHODS FOR MACHINE LEARNING IN HYPERBOLIC SPACE

(71) Applicant: Google LLC, Mountain View, CA (US)

(72) Inventors: Ankit Singh Rawat, New York, NY (US); Manzil Zaheer, Mountain View, CA (US); Aditya Krishna Menon, New York, NY (US); Sanjiv Kumar, Jericho, NY (US); Melanie Weber, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 1226 days.

(21) Appl. No.: 17/227,817

(22) Filed: Apr. 12, 2021

(65) Prior Publication Data

US 2021/0319339 A1      Oct. 14, 2021

Related U.S. Application Data

(60) Provisional application No. 63/008,288, filed on Apr. 10, 2020.

(51) Int. Cl.
G06N 5/04 (2023.01)
G06N 20/00 (2019.01)
(52) U.S. Cl.
CPC ............... G06N 5/04 (2013.01); G06N 20/00 (2019.01)
(58) Field of Classification Search
CPC ................................. G06N 5/04; G06N 20/00
See application file for complete search history.

(56) References Cited

U.S. PATENT DOCUMENTS

| | | | |
|---|---|---|---|
| 11,132,602 B1* | 9/2021 | Xie ..................... | G06F 9/44552 |
| 2020/0159589 A1* | 5/2020 | Capes ...................... | G06N 7/08 |
| 2021/0090694 A1* | 3/2021 | Colley ................... | G16B 30/00 |
| 2022/0374750 A1* | 11/2022 | Smelyanskiy ......... | G06N 10/70 |

OTHER PUBLICATIONS

"Ganea et al., Hyperbolic Neural Networks, Jun. 28, 2018, arXiv. org, p. 1-5" (Year: 2018).*
"Nickel et al., Learning Continuous Hierarchies in the Lorentz Model of Hyperbolic Geometry, Jul. 8, 2018, arXiv.org, p. 1" (Year: 2018).*
"Papernot et al., Practical Black-Box Attacks against Machine Learning, Mar. 19, 2017, arXiv.org, p. 507-508" (Year: 2017).*
Bertsekas, "Nonlinear Programming", Athena Scientific, Belmont, Massachusetts, 1995, 372 pages.
Bridson et al., "Metric Spaces of Non-Positive Curvature", Springer-Verlag, Germany, Mar. 1999, 662 pages.
Chamberlain et al., "Neural Embeddings of Graphs in Hyperbolic Space", arXiv:1705.10359v1, May 29, 2017, 7 pages.
Charles et al., "Convergence and Margin of Adversarial Training on Separable Data", arXiv:1905.09209v1, May 22, 2019, 25 pages.

(Continued)

*Primary Examiner* — Ryan C Vaughn
(74) *Attorney, Agent, or Firm* — DORITY & MANNING, P.A.

(57) ABSTRACT

Generally, the present disclosure provides systems and methods for performing machine learning in hyperbolic space. Specifically, techniques are provided which enable the learning of a classifier (e.g., large-margin classifier) for data defined within a hyperbolic space (e.g., which may be particularly beneficial for data possessing a hierarchical structure).

20 Claims, 9 Drawing Sheets

700

702 — ACCESS A CURRENT SET OF WEIGHTS OF A MACHINE-LEARNED CLASSIFICATION MODEL AND A PLURALITY OF TRAINING EXAMPLES, WHEREIN EACH OF THE PLURALITY OF TRAINING EXAMPLES COMPRISES A RESPECTIVE INPUT DEFINED WITHIN A HYPERBOLIC SPACE AND A RESPECTIVE GROUND TRUTH LABEL

704 — IDENTIFY ONE OR MORE ADVERSARIAL TRAINING EXAMPLES RESPECTIVELY FOR ONE OR MORE OF THE PLURALITY OF TRAINING EXAMPLES, WHEREIN, FOR EACH OF THE ONE OR MORE OF THE PLURALITY OF TRAINING EXAMPLES, THE RESPECTIVE ADVERSARIAL TRAINING EXAMPLE COMPRISES AN ALTERNATIVE INPUT THAT, AMONG ALL POSSIBLE INPUTS THAT ARE CONTAINED IN THE HYPERBOLIC SPACE AND THAT HAVE A RESPECTIVE DISTANCE TO THE INPUT OF THE TRAINING EXAMPLE THAT IS LESS THAN AN ADVERSARIAL BUDGET, MAXIMIZES A LOSS FUNCTION THAT EVALUATES AN OUTPUT OF THE MACHINE-LEARNED CLASSIFICATION MODEL

706 — DETERMINE AN UPDATED SET OF WEIGHTS FOR THE MACHINE-LEARNED CLASSIFICATION MODEL BASED AT LEAST IN PART ON AT LEAST ONE OR MORE ADVERSARIAL TRAINING EXAMPLES

708 — OUTPUT THE UPDATED SET WEIGHTS FOR THE MACHINE-LEARNED CLASSIFICATION MODEL

(56) References Cited

OTHER PUBLICATIONS

Cho et al., "Large-Margin Classification in Hyperbolic Space", Proceedings of Machine Learning Research, vol. 89, Apr. 2019, 9 pages.

Cohn et al., "Sphere Packing Bounds via Spherical Codes", arXiv:1212.5966v2, Dec. 21, 2013, 30 pages.

Cortes et al., "Support-Vector Networks", Machine Learning, vol. 20, No. 3, 1995, pp. 273-297.

Danskin, "The Theory of Max-Min, with Applications", SIAM Journal on Applied Mathematics, vol. 14, No. 4, Jul. 1966, pp. 641-664.

Fawzi et al., "Adversarial vulnerability for any classifier", Thirty-Second Conference on Neural Information Processing Systems (NIPS), Dec. 2-8, 2018, Montreal, Canada, 10 pages.

Freund et al., "Large Margin Classification Using the Perceptron Algorithm", Machine Learning, vol. 37, No. 3, 1999, 19 pages.

Ganea et al., "Hyperbolic Neural Networks", Thirty-Second Conference on Neural Information Processing Systems (NIPS), Dec. 2-8, 2018, Montreal, Canada, 11 pages.

Ghaoui et al., "Robust Classification with Interval Data", University of California Berkeley, Technical Report, Oct. 2003, 19 pages.

Ji et al., "Risk and parameter convergence of logistic regression", arXiv:1803.07300v2, Jun. 1, 2018, 23 pages.

Kim et al., "Robust Fisher Discriminant Analysis", Twentieth Conference on Neural Information Processing Systems, Dec. 4-9, 2006, Vancouver, Canada, 8 pages.

Lanckriet et al., "A Robust Minimax Approach to Classification", Journal of Machine Learning Research, vol. 3, 2002, pp. 555-582.

Lebanon et al., "Hyperplane Margin Classifiers on the Multinomial Manifold", Twenty-first International Conference (ICML 2004), Jul. 4-8, 2004, Banff, Canada, 8 pages.

Li et al., "Implicit Bias of Gradient Descent Based Adversarial Training on Separable Data", Eighth International Conference on Learning Representations, Apr. 26-May 1, 2020, Addis Ababa, Ethiopia, 25 pages.

Linial et al., "The Geometry of Graphs and Some of its Algorithmic Applications", Combinatorica, vol. 15, No. 2, 1995, pp. 215-245.

Madry et al., "Towards Deep Learning Models Resistant to Adversarial Attacks", Sixth International Conference on Learning Representations, Apr. 30-May 3, 2018, Vancouver, Canada, 23 pages.

Monath et al., "Gradient-based Hierarchical Clustering using Continuous Representations of Trees in Hyperbolic Space", 25th ACM SIGKDD International Conference on Knowledge Discovery and Data Mining, Aug. 4-8, 2019, Anchorage, Alaska, pp. 714-722.

Nickel et al., "Learning Continuous Hierarchies in the Lorentz Model of Hyperbolic Geometry", Thirty-Fifth International Conference on Machine Learning, Jul. 10-15, 2018, Stockholm, Sweden, 10 pages.

Nickel et al., "Poincare Embeddings for Learning Hierarchical Representations", Thirty-first Conference on Neural Information Processing Systems, Dec. 4-9, 2017, Long Beach, California, 10 pages.

Novikoff, "On Convergent Proofs for Perceptrons", Symposium on Mathematical Theory of Automata, Apr. 24-26, 1962, Brooklyn, NY, 8 pages.

Rosenblatt, "The Perceptron: a Probabilistic Model for Information Storage and Organization in the Brain", Psychological Review, vol. 65, No. 6, 1958, pp. 386-408.

Russakovsky et al., "ImageNet Large Scale Visual Recognition Challenge", arXiv:1409.0575v3, Jan. 30, 2015, 43 pages.

Sala et al., "Representation Tradeoffs for Hyperbolic Embeddings", Thirty-fifth International Conference on Machine Learning, Jul. 10-15, 2018, Stockholm, Sweden, 10 pages.

Sarkar, "Low Distortion Delaunay Embedding of Trees in Hyperbolic Plane", International Symposium on Graph Drawing, Sep. 21-23, 2011, Eindhoven, The Netherlands, pp. 355-366.

Shannon, "Probability of Error for Optimal Codes in Gaussian Channel", The Bell System Technical Journal, vol. XXXVIII, No. 3, May 1959, pp. 611-656.

Soudry et al., "The Implicit Bias of Gradient Descent on Separable Data", Journal of Machine Learning, vol. 19, 2018, 57 pages.

Tifrea et al., "Poincare GloVe: Hyperbolic Word Embeddings", Seventh International Conference on Learning Representations, May 6-9, 2019, New Orleans, Louisiana, 24 pages.

Weber, "Neighborhood Growth Determines Geometric Priors for Relational Representation Learning", Twenty-third International Conference on Artificial Intelligence and Statistics, Jun. 3-5, 2020, Sicily, Italy, 10 pages.

* cited by examiner $\mathbf{P}^d$

POINCARE HALF-PLANE $\mathbf{L}^d$

LORENTZ MODEL

ALGORITHM 1 HYPERBOLIC PERCEPTRON (h-PERCEPTRON)

Initialize $w_0 \in \mathbb{R}^{d+1}$ for $t = 0,1,..., T-1$ do for $j = 1,..., n$ do

$y' \leftarrow \text{sgn}\left(xj * w_t\right)$ if $y' \neq y_j$ then

$vt \leftarrow w_t + y_j x_j$ if $\sqrt{-vt * v_t} < 1$ then

$$v_t \leftarrow \frac{v_t}{\sqrt{-v_t * v_t}}$$

end if break end if end for

$w_{t+1} \leftarrow v_t$ end for

Output: $w_T$

Figure 3:
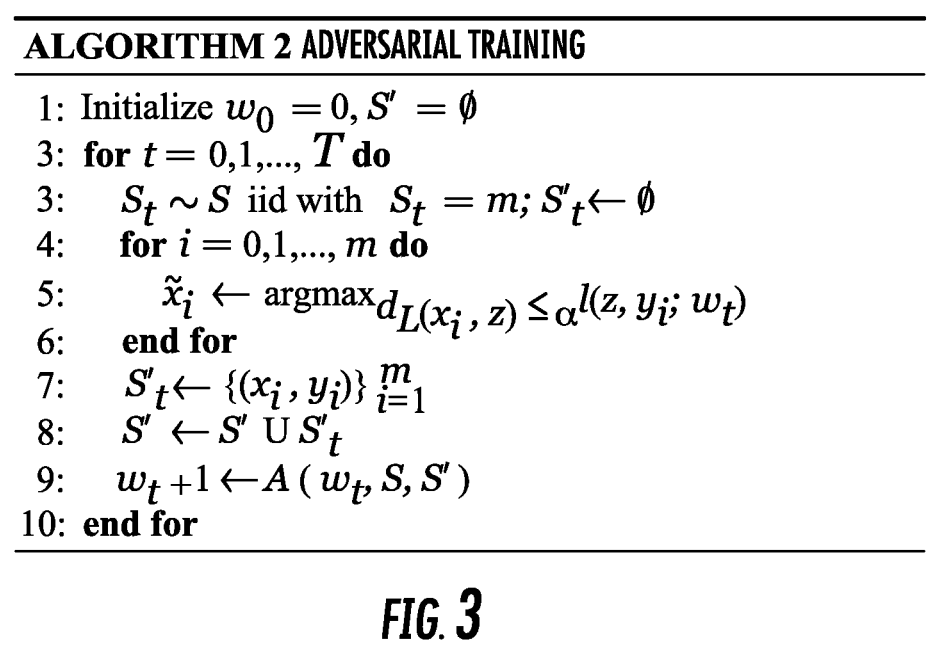

ALGORITHM 2 ADVERSARIAL TRAINING

---

1: Initialize $w_0 = 0, S' = \emptyset$

3: for $t = 0,1,..., T$ do

3:    $S_t \sim S$ iid with $S_t = m; S'_t \leftarrow \emptyset$

4:    for $i = 0,1,..., m$ do

5:       $\tilde{x}_i \leftarrow \text{argmax}_{d_{L(x_i, z)} \le \alpha} l(z, y_i; w_t)$ 6:    end for

7:    $S'_t \leftarrow \{(x_i, y_i)\}_{i=1}^{m}$

8:    $S' \leftarrow S' \cup S'_t$

9:    $w_t + 1 \leftarrow A(w_t, S, S')$

10: end for

HYPERBOLIC MARGIN

EUCLIDEAN MARGIN

<u>600</u>

602 — ACCESS A CURRENT SET OF WEIGHTS OF A MACHINE-LEARNED CLASSIFICATION MODEL AND A PLURALITY OF TRAINING EXAMPLES, WHEREIN EACH OF THE PLURALITY OF TRAINING EXAMPLES COMPRISES A RESPECTIVE INPUT DEFINED WITHIN A HYPERBOLIC SPACE AND A RESPECTIVE GROUND TRUTH LABEL

604 — OBTAIN NEXT TRAINING EXAMPLE

606 — GENERATE A PREDICTED LABEL FOR THE INPUT OF THE TRAINING EXAMPLE

NO — PREDICTED LABEL DIFFERENT FROM THE GROUND TRUTH LABEL OF THE TRAINING EXAMPLE? — 608

YES

610 — DETERMINE AN INTERMEDIATE SET OF WEIGHTS FOR THE MACHINE-LEARNED CLASSIFICATION MODEL BASED AT LEAST IN PART ON THE PREDICTED LABEL FOR THE RESPECTIVE INPUT

612 — NORMALIZE THE INTERMEDIATE SET OF WEIGHTS TO OBTAIN AN UPDATED SET OF WEIGHTS FOR WHICH A MINKOWSKI PRODUCT OF THE UPDATED SET OF WEIGHTS WITH ITSELF IS LESS THAN ZERO

ADDITIONAL TRAINING EXAMPLES REMAIN? — 614

YES

NO

616 — OUTPUT THE UPDATED SET WEIGHTS FOR THE MACHINE-LEARNED CLASSIFICATION MODEL

*FIG. 6*

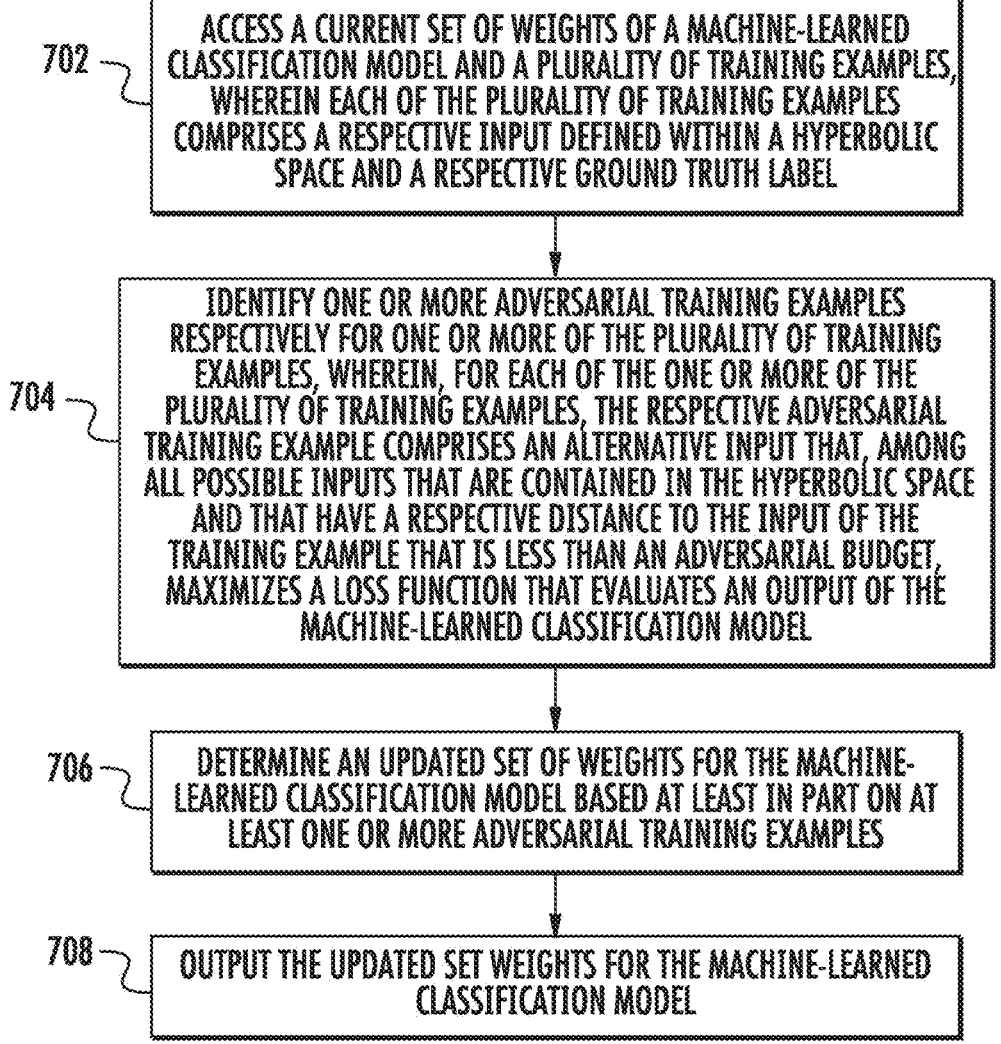

700

702 — ACCESS A CURRENT SET OF WEIGHTS OF A MACHINE-LEARNED CLASSIFICATION MODEL AND A PLURALITY OF TRAINING EXAMPLES, WHEREIN EACH OF THE PLURALITY OF TRAINING EXAMPLES COMPRISES A RESPECTIVE INPUT DEFINED WITHIN A HYPERBOLIC SPACE AND A RESPECTIVE GROUND TRUTH LABEL

704 — IDENTIFY ONE OR MORE ADVERSARIAL TRAINING EXAMPLES RESPECTIVELY FOR ONE OR MORE OF THE PLURALITY OF TRAINING EXAMPLES, WHEREIN, FOR EACH OF THE ONE OR MORE OF THE PLURALITY OF TRAINING EXAMPLES, THE RESPECTIVE ADVERSARIAL TRAINING EXAMPLE COMPRISES AN ALTERNATIVE INPUT THAT, AMONG ALL POSSIBLE INPUTS THAT ARE CONTAINED IN THE HYPERBOLIC SPACE AND THAT HAVE A RESPECTIVE DISTANCE TO THE INPUT OF THE TRAINING EXAMPLE THAT IS LESS THAN AN ADVERSARIAL BUDGET, MAXIMIZES A LOSS FUNCTION THAT EVALUATES AN OUTPUT OF THE MACHINE-LEARNED CLASSIFICATION MODEL

706 — DETERMINE AN UPDATED SET OF WEIGHTS FOR THE MACHINE-LEARNED CLASSIFICATION MODEL BASED AT LEAST IN PART ON AT LEAST ONE OR MORE ADVERSARIAL TRAINING EXAMPLES

708 — OUTPUT THE UPDATED SET WEIGHTS FOR THE MACHINE-LEARNED CLASSIFICATION MODEL

FIG. 7

SYSTEMS AND METHODS FOR MACHINE LEARNING IN HYPERBOLIC SPACE

RELATED APPLICATIONS

This application claims priority to and the benefit of U.S. Provisional Patent Application No. 63/008,288, filed Apr. 10, 2020. U.S. Provisional Patent Application No. 63/008, 288 is hereby incorporated by reference in its entirety.

FIELD

The present disclosure relates generally to machine learning in hyperbolic space. More particularly, the present disclosure relates to systems and methods that perform normalization techniques and/or identify adversarial examples to facilitate machine learning in hyperbolic space.

BACKGROUND

More particularly, hyperbolic spaces have received sustained interest in recent years, owing to their ability to compactly represent data possessing hierarchical structure (e.g., trees and graphs). In terms of representation learning, hyperbolic spaces offer a provable advantage over Euclidean spaces for such data: objects requiring an exponential number of dimensions in Euclidean space can be represented in a polynomial number of dimensions in hyperbolic space. This has motivated research into efficiently learning a suitable hyperbolic embedding for large-scale datasets.

Despite this impressive representation power, little is known about the benefits of hyperbolic spaces for downstream tasks. For example, suppose one wishes to perform classification on data that are intrinsically hierarchical. One may naïvely ignore this structure and use a standard Euclidean embedding and corresponding classifier (e.g., SVM). However, it has not previously been shown that classification algorithms can be designed that exploit the structure of hyperbolic space and offer provable benefits in terms of performance (e.g., predictive accuracy), This fundamental question has received surprisingly limited attention. Indeed, while some prior work has proposed specific algorithms for learning classifiers in hyperbolic space, these have been primarily empirical in nature, and do not come equipped with theoretical guarantees on convergence and generalization.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to learn a machine-learned classification model in a hyperbolic space. The method includes, for at least one of one or more training iterations: accessing, by a computing system comprising one or more computing devices, a current set of weights of the machine-learned classification model and a plurality of training examples, wherein each of the plurality of training examples comprises a respective input defined within the hyperbolic space and a respective ground truth label; identifying, by the computing system, one or more adversarial training examples respectively for one or more of the plurality of training examples, wherein, for each of the one or more of the plurality of training examples, the respective adversarial training example comprises an alternative input that, among all possible inputs that are contained in the hyperbolic space and that have a respective distance to the input of the training example that is less than an adversarial budget, maximizes a loss function that evaluates an output of machine-learned classification model; determining, by the computing system, an updated set of weights for the machine-learned classification model based at least in part on at least one of the one or more adversarial training examples; and outputting, by the computing system, the updated set of weights for the machine-learned classification model.

Another example aspect of the present disclosure is directed to a computing system for performing machine learning in hyperbolic space. The computing system includes one or more processors and one or more non-transitory computer-readable media that collectively store instructions that, when executed by the one or more processors cause the computing system to perform operations. The operations include, for at least one of one or more training iterations: accessing, by the computing system, a current set of weights of a machine-learned classification model and a plurality of training examples, wherein each of the plurality of training examples comprises a respective input defined within the hyperbolic space and a respective ground truth label. The operations include, for each of the plurality of training examples: generating, by the computing system, a predicted label for the respective input. When the predicted label is different from the respective ground truth label, the operations include determining, by the computing system, an intermediate set of weights for the machine-learned classification model based at least in part on the predicted label for the respective input; and normalizing, by the computing system, the intermediate set of weights to obtain an updated set of weights for which a Minkowski product of the updated set of weights with itself is less than zero. The operations include outputting, by the computing system, the updated set of weights for the machine-learned classification model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts an example algorithm for learning a hyperbolic perceptron according to example embodiments of the present disclosure.

FIG. 3 depicts an example algorithm for learning a classifier in hyperbolic space according to example embodiments of the present disclosure.

3

Figures 4A, 4B:
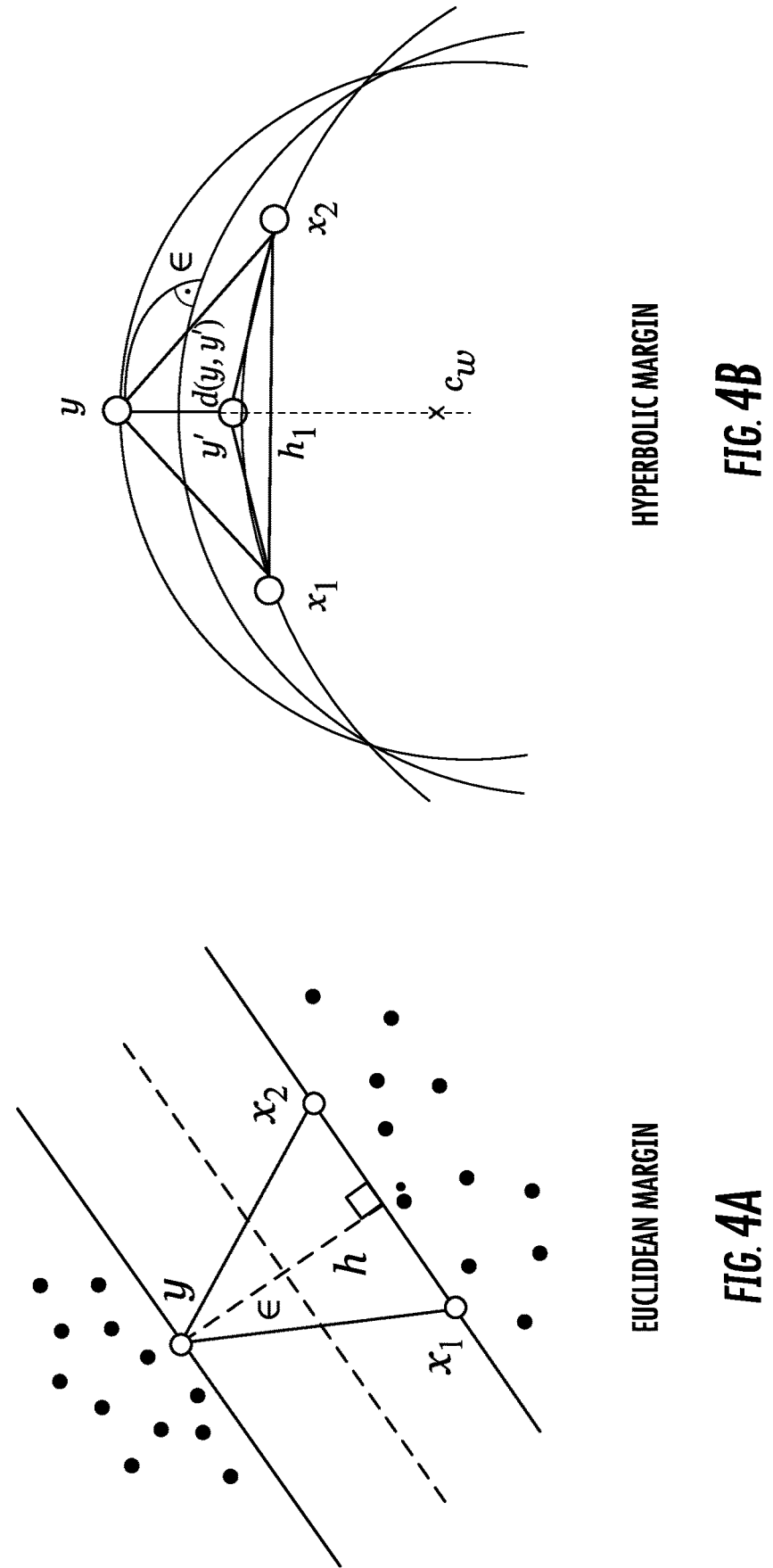

FIG. 4A shows a Euclidean margin as a distance between support vectors according to example embodiments of the present disclosure.

FIG. 4B shows a hyperbolic margin as a distance between support vectors according to example embodiments of the present disclosure.

Figure 5A:
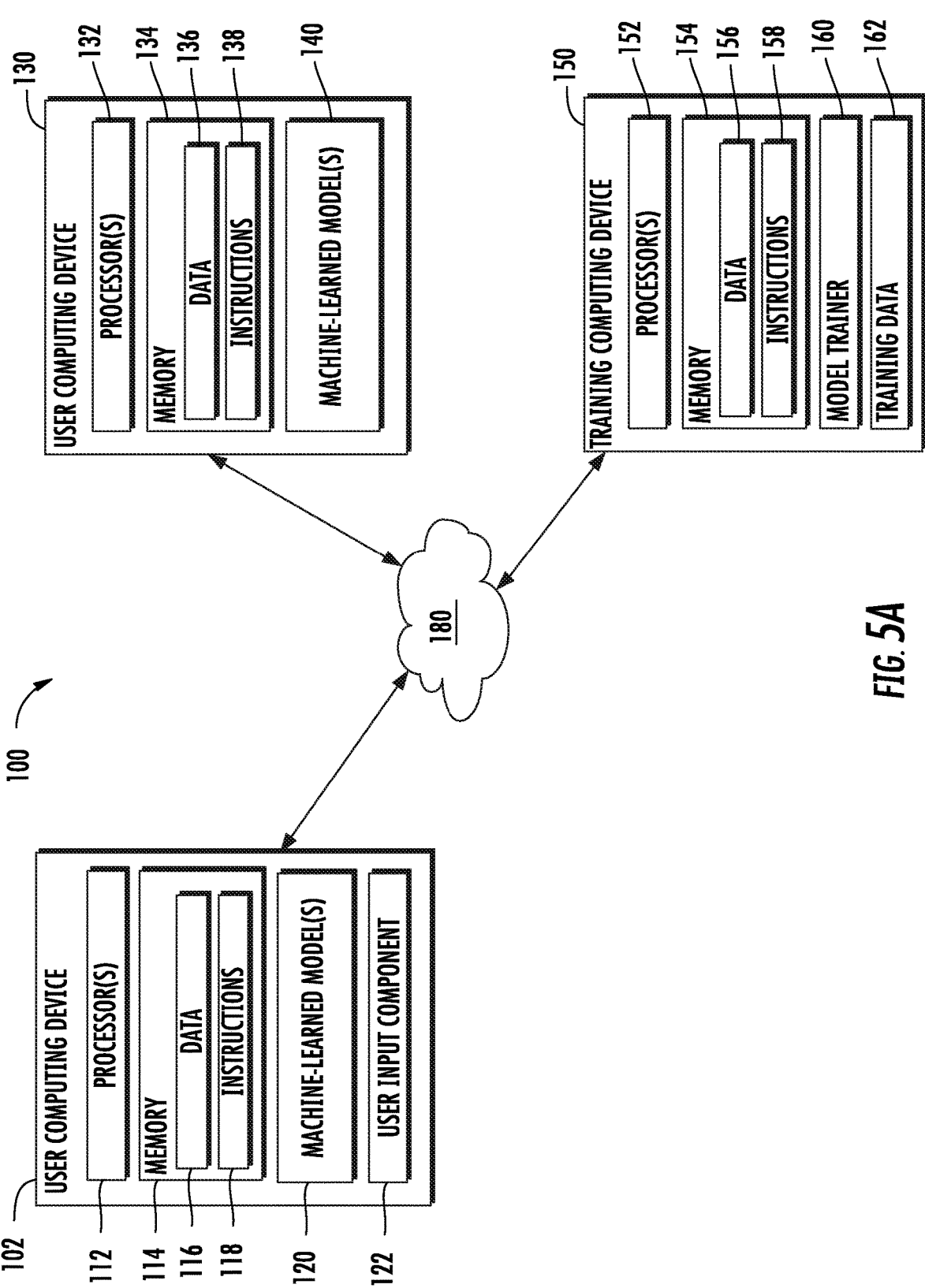

FIG. 5A depicts a block diagram of an example computing system according to example embodiments of the present disclosure.

Figure 5B:
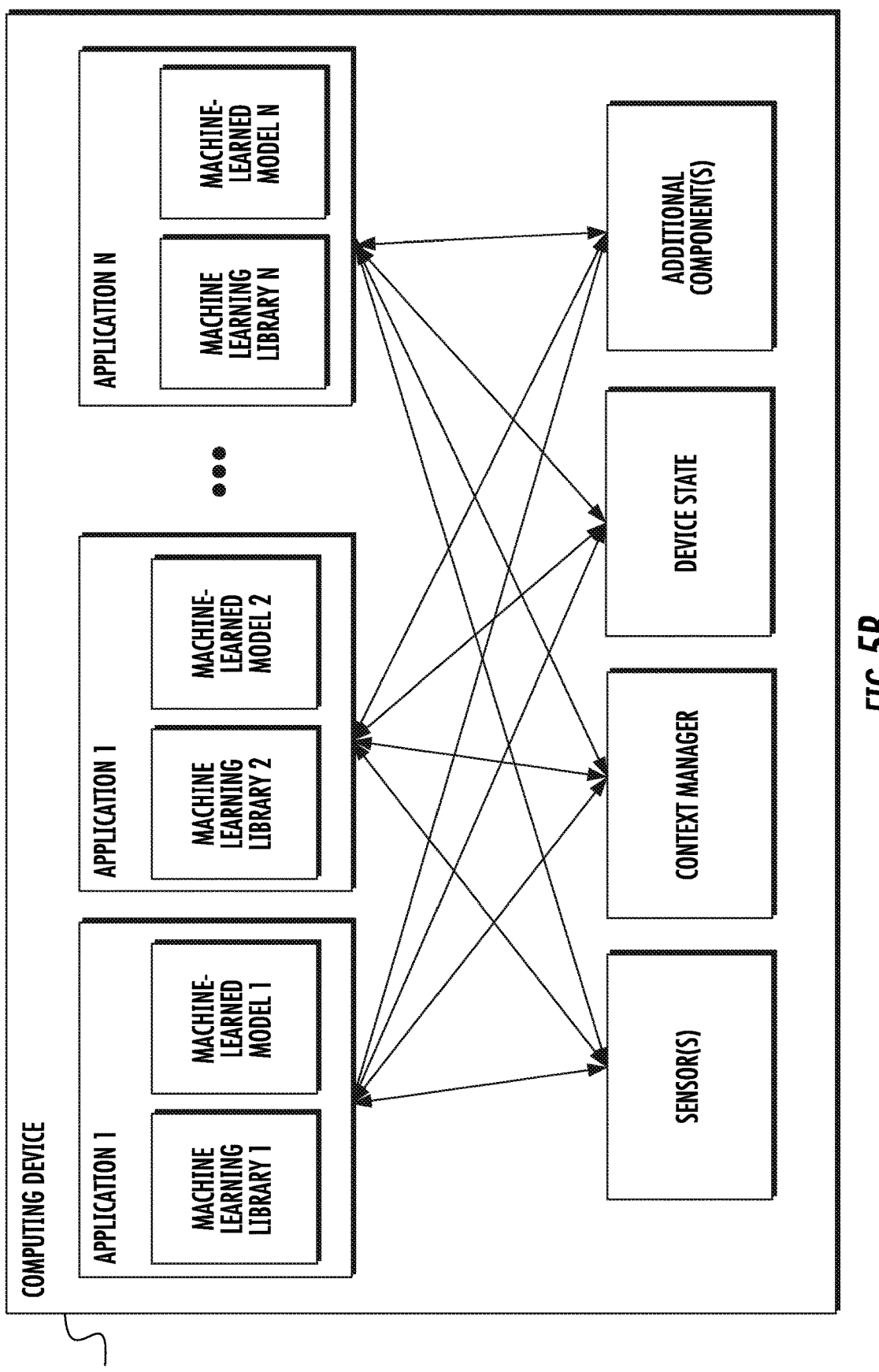

FIG. 5B depicts a block diagram of an example computing device according to example embodiments of the present disclosure.

Figure 5C:
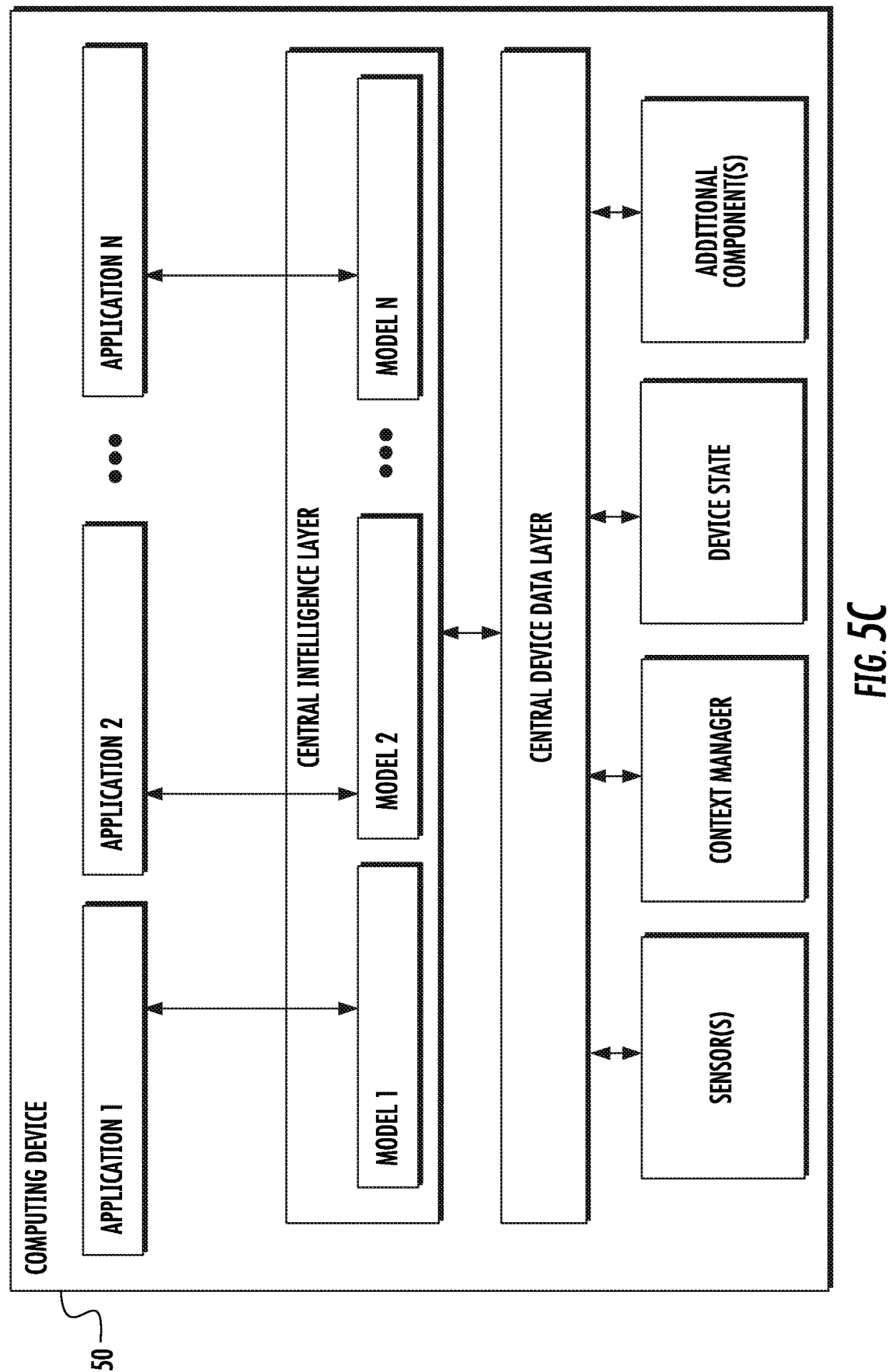

FIG. 5C depicts a block diagram of an example computing device according to example embodiments of the present disclosure.

FIG. 6 depicts a flow chart diagram of an example method to perform machine learning in hyperbolic space according to example embodiments of the present disclosure.

FIG. 7 depicts a flow chart diagram of an example method to learn a machine-learned classification model in hyperbolic space according to example embodiments of the present disclosure.

Reference numerals that are repeated across plural figures are intended to identify the same features in various implementations.

DETAILED DESCRIPTION

1. Overview

Generally, the present disclosure provides systems and methods for performing machine learning in hyperbolic space. Specifically, techniques are provided which enable the learning of a classifier (e.g., large-margin classifier) for data defined within a hyperbolic space (e.g., which may be particularly beneficial for data that possess a hierarchical structure).

One example aspect of the present disclosure is a hyperbolic perceptron algorithm, which provably converges to a separating hyperplane. In particular, the present disclosure provides a hyperbolic version of the classic perceptron algorithm and establishes its convergence for data that are separable with a margin. The provided algorithm establishes that it is possible to design classification algorithms that exploit the structure of hyperbolic space, while provably converging to some admissible (not necessarily large-margin) separator.

Another example aspect of the present disclosure provides algorithms to efficiently learn a machine-learned classification model (e.g., a large-margin hyperplane for a large-margin classifier), relying on the careful injection of adversarial examples. In particular, the present disclosure establishes how suitable injection of adversarial examples to gradient-based loss minimization can yield an algorithm which can efficiently learn a classification model. The present disclosure further demonstrates that simply performing gradient descent or using adversarial examples alone typically does not suffice to yield such a classifier efficiently. Thus, the provided algorithms establish that it is further possible to design classification algorithms that provably converge to a large-margin separator, by suitably injecting adversarial examples.

Yet another example aspect of the present disclosure provides proof that for hierarchical data that embed well into hyperbolic space, the low embedding dimension ensures superior guarantees when learning the classifier directly in hyperbolic space. In particular, the present disclosure compares the Euclidean and hyperbolic approaches for hierarchical data and analyzes the trade-off between low embedding dimensions and low distortion (dimension-distortion trade-off) when learning robust classifiers on embedded data. For hierarchical data that embed well into hyperbolic space, the low embedding dimension is sufficient to ensure superior guarantees when learning the classifier in hyperbolic space. Therefore, the present disclosure shows that the adaptation of algorithms to the intrinsic geometry of the data can lead to significant performance gains.

Thus, the present disclosure provides systems and methods for performing machine learning (e.g., learning a classification model such as a large-margin classifier) in hyperbolic space. Algorithms are provided for provably learning such classifiers in hyperbolic space. Technical analysis establishes that these can be superior to classifiers learned in naïve Euclidean space. Therefore, by using a hyperbolic space that better reflects the intrinsic geometry of the data, one can see gains in both representation size and performance.

The systems and methods of the present disclosure provide a number of technical effects and benefits. As one example, by enabling machine learning to be performed in hyperbolic space, improved machine-learned models such as classification models can be developed, which better leverage the intrinsic geometry of certain input data such as data which are hierarchical in nature. Thus, enabling machine learning to be performed in hyperbolic space, models can be generated which better account for (e.g., run faster, make better predictions, train faster, etc.) the structure of certain forms of input data.

As another example, aspects of the present disclosure provide algorithms for learning models in hyperbolic space with guaranteed convergence and/or other guarantees. By providing techniques with guaranteed convergence and/or other guarantees, the failure of certain models to converge can be reduced or eliminated. More generally, by providing techniques with guaranteed convergence and/or other guarantees, training attempts or schemes which fail or otherwise represent lost or unproductive usage of computing resources (e.g., processor usage, memory usage, network bandwidth, etc.) can be reduced or eliminated, thereby conserving computing resources.

2. Example Discussion of Hyperbolic Space and Notation

2.1 Hyperbolic Space

Hyperbolic spaces are smooth Riemannian manifolds $\mathcal{M} = \mathbb{H}^d$ with constant negative curvature $\kappa$ and are as such locally Euclidean spaces. The following introduces basic notation for two popular models of hyperbolic spaces. However, other models of hyperbolic space can be used with the present disclosure as well.

There are several equivalent models of hyperbolic space, each highlighting a different geometric aspect. In this work, the Lorentz model (aka hyperboloid model) is most prominently discussed for consistency. For x, $x' \in \mathbb{R}^{d+1}$, let $x^*x' = x_0 x'_0 - \sum_{i=1}^{d} x_i x'_i$ denote their Minkowski product. The Lorentz model is defined as follows:

$$\mathbb{R}^d = \{x \in \mathbb{R}^{d+1} : x^*x = 1\}$$

$$d_{\mathbb{L}}(x,x') = a \cos h(x^*x').$$

Figure 1B:
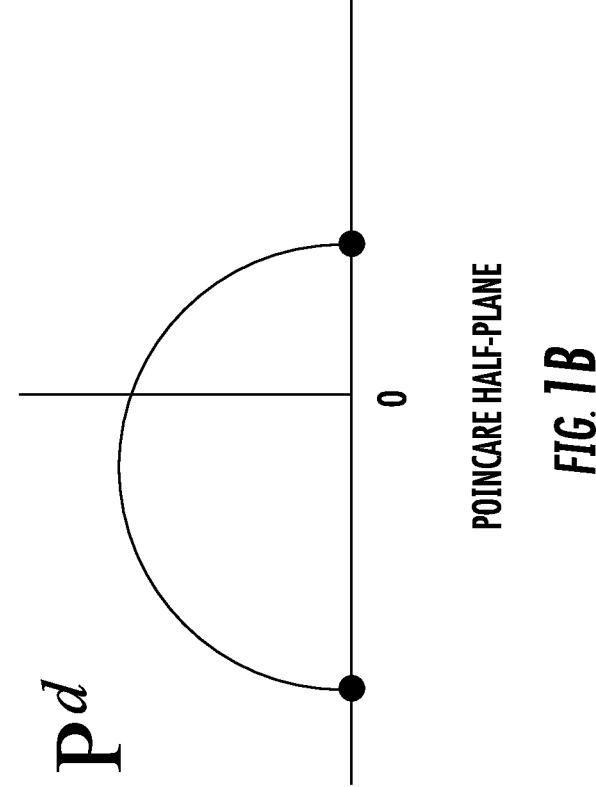
FIGS. 1A and 1B show example hyperbolic models with geodesics according to example embodiments of the present disclosure.
Figure 1A:
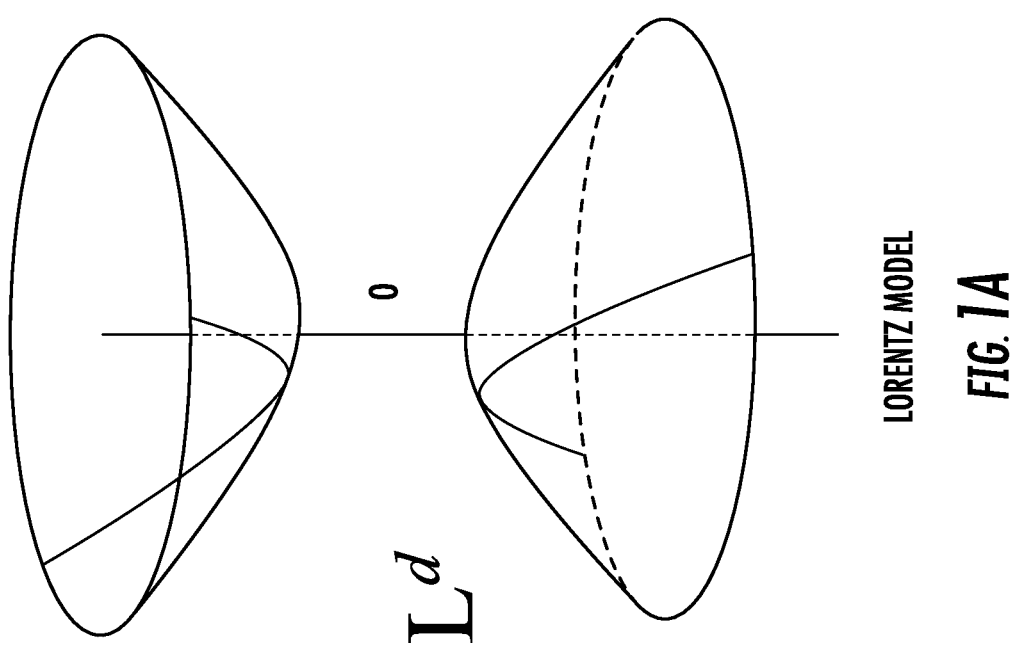

The distance $d_{\mathbb{L}}(x, y)$ corresponds to the length of the shortest line (geodesic) along the manifold connecting x and x' (cf. FIG. 1A). Note that $(\mathbb{R}, d_{\mathbb{L}})$ forms a metric space.

Another model of hyperbolic space that can be used is the Poincare half-plane model, which defines a hyperbolic metric space on the upper half of the complex plane as follows:

$$\mathbb{P}^2 = \left\{ x = (x_0, x_1) \in \mathbb{R}^2 : x_1 > 0 \right\}$$

$$d_{\mathbb{P}}(x, x') = a\cosh\left( 1 + \frac{(x'_0 - x_0)^2 + (x'_1 - x_1)^2}{2x_1 x'_1} \right).$$

The Poincare half-plane model can also be defined for higher dimensions. Furthermore, there exists an isometric mapping between both Lorentz model and Poincare half-plane model that preserves the Minkowski product.

2.2 Embeddability of Hierarchical Data

A map $\phi \colon X_1 \rightarrow X_2$ between metric spaces $(X_1, d_1)$ and $(X_2, d_2)$ is called embedding. One can measure embeddability using the following multiplicative notion of distortion: Define $c_M \geq 1$ such that for all $x$, $x' \in X_1$ $$d_2(\phi(x),\phi(x'))) \leq d_1(x,x') \leq c_M \cdot d_2(\phi(x),\phi(x')).$$

Embeddings with multiplicative distortion $c_M = 1$ are termed isometric embeddings.

Since hierarchical data are tree-like, one can use classic embeddability results for trees as a reference point. For the embeddability of trees, it has been shown that an N-point metric $\mathcal{X}$ (i.e., $|\mathcal{X}| = N$) embeds into Euclidean space $\mathbb{R}^{O(\log_2 N)}$ with the distortion $c_M = O(\log N)$. This bound is tight for trees in the sense that embedding them in a Euclidean space (of any dimension) must incur the distortion $c_m = \Omega(\log N)$. On the other hand, trees embed quasi-isometrically with $c_m = O(1+\varepsilon)$ into hyperbolic space $\mathbb{H}^d$. This holds even in the low-dimensional regime with the dimension as small as d=2.

2.3 Classification in Hyperbolic Space

Example aspects of the present disclosure consider classification problems of the following form: $\mathcal{X} \subset \mathbb{L}^d$ denotes the feature space, $\mathcal{Y}$ the label space and $\mathcal{W} \subset \mathbb{R}^{d+1}$ the model space. For now, consider a binary classification task, i.e., $\mathcal{Y} = \{\pm 1\}$. In the following, the training set is denoted as as $\mathcal{S} \subset \mathcal{X} \times \mathcal{Y}$.

This discussion begins by defining geodesic decision boundaries. Consider the Lorentz space $\mathbb{L}^d$ with ambient space $\mathbb{R}^{d+1}$. Then every geodesic decision boundary is a hyperplane in $\mathbb{R}^d$ intersecting $\mathbb{L}^d$ and $\mathbb{R}^{d+1}$. Further, consider the set of linear separators or decision functions of the form $$\mathcal{H} = \left\{ h_w \colon \in \mathbb{R}^{d+1}, w * w < 0 \right\}, \tag{2.1}$$

where $$h_w(x) = \begin{pmatrix} 1, & w * x > 0 \\ -1, & \text{otherwise} \end{pmatrix}.$$

Note that the requirement w*w<0 in (2.1) ensures that the intersection of $\mathbb{L}^d$ and the decision hyperplane $h_w$ is not empty. The geodesic decision boundary corresponding to the decision function $h_w$ is then given by $$\partial\mathcal{H}_w = \{z \in \mathbb{L}^d : w*z = 0\}.$$

The distance of a point $x \in \mathbb{L}^d$ from the decision boundary $\partial\mathcal{H}_w$ can be computed as:

$$d(x, \partial\mathcal{H}_w) = \left| a\sinh\left( \frac{w * x}{\sqrt{-w * w}} \right) \right|.$$

2.4 Large-Margin Classification in Hyperbolic Space

Example aspects of the present disclosure enable learning a large margin classifier in a hyperbolic space. Analogous to the Euclidean setting, the natural notion of margin is the minimal distance to the decision boundary over all training samples:

$$\text{margin}_{\mathcal{S}}(w) = \inf_{(x,y) \in \mathcal{S}} y h_w(x) \cdot d(x, \partial\mathcal{H}_w) = \inf_{(x,y) \in \mathcal{S}} \left( \frac{y(w * x)}{\sqrt{-w * w}} \right). \tag{2.2}$$

The goal of large-margin classifier learning is then to find a linear separator $h_{w*}$ defined by:

$$w* = \text{argmax}_w \, \text{margin}_{\mathcal{S}}(w).$$

3. Example Hyperbolic Linear Separator Learning

One step towards learning a large-margin classifier is to establish the ability to provably learn some separator. To this end, this section and FIG. 2 present a hyperbolic version of the classic perceptron algorithm and establish that it will converge on data that are separable with a margin.

3.1 Example Hyperbolic Perceptron Algorithm

The hyperbolic perceptron (cf. Algorithm 1 in FIG. 2) learns a binary classifier with respect to the Minkowski product. This is implemented in the update rule:

$$v_t \leftarrow w_t + yx.$$

In contrast to the Euclidean case, the present disclosure enables learning the hyperbolic perceptron via application of a normalization step:

$$w_{t+1} \leftarrow \frac{v_t}{\sqrt{-v_t * v_t}}.$$

This ensures that $w_{t+1} * w_{t+1} < 0$; as a result $w_{t+1}$ defines a meaningful classifier, i.e., $\mathbb{L}^d \cap \partial\mathcal{H}_{w_{t+1}} \neq \emptyset$.

It remains to establish that this algorithm converges, i.e., finds a solution which correctly classifies all the training samples. To this end, consider the following notion of hyperbolic linear separability with a margin: for X, $X' \subseteq \mathbb{L}^d$, it can be said that X and X' are linearly separable with margin $\gamma$, if there exists a $w \in \mathbb{R}^{d+1}$ with $\sqrt{-w*w}=1$ such that $$w*x > \gamma \, \forall x \in X \text{ and } w*x' < -\gamma \, \forall x' \in X',$$

where $\gamma' = a \sin h(\gamma)$. Assuming our training set is separable with a margin, the hyperbolic perceptron has the following convergence guarantee.

Theorem 3.1. Assume that there is some $\overline{w} \in \mathbb{R}^{d+1}$ with $\sqrt{-\overline{w}*\overline{w}}=1$ and $w_0* \overline{w} \geq 0$, and some $\gamma > 0$, such that $y_j(\overline{w}*x_j) \geq \sin h(\gamma)$ for j=1, . . . , $|\mathcal{S}|$. Then, Algorithm 1 converges in $$O\left( \frac{1}{\sinh(\gamma)} \right)$$

steps and returns a solution with margin $\gamma$.

The proof of Theorem 3.1 follows the standard proof of the Euclidean perceptron and utilizes the Cauchy-Schwartz inequality for the Minkowski product.

Remark 3.2 Recall that the classic guarantee for the perceptron algorithm in Euclidean space establishes a $O(1/\gamma^2)$ convergence rate When $\gamma\sim 0$, the $$\frac{1}{\sinh(\gamma)}$$

convergence rate for hyperbolic spaces can be significantly faster than $$\frac{1}{\gamma^2},$$

indicating that exploiting the structure of hyperbolic space can be beneficial.

3.2 A Challenge of Large-Margin Learning

Theorem 3.1 establishes that the hyperbolic perceptron converges to some linear separator. However, for the purposes of generalization, one would ideally like to converge to a large-margin separator. As with the classic Euclidean perceptron, no such guarantee is possible for the hyperbolic perceptron; this motivates asking whether a suitable modification can rectify this.

One example way to proceed is to consider the use of margin losses, such as the logistic or hinge loss. Formally, let l: $\mathcal{X}\times\{\pm 1\}\to\mathbb{R}_+$ be a loss function of the form $$l(x,y;w)=f(y\cdot(w^*x)), \tag{3.1}$$

where $f:\mathbb{R}\to\mathbb{R}_+$ is some convex, non-increasing function, e.g., the hinge loss. The empirical risk of the classifier parametrized by w on the training set $S\subset\mathcal{X}\times\{\pm 1\}$ is $$L(w;S)=\frac{1}{|S|}\sum_{(x,y)\in S} l(w,y;w).$$

A common strategy to learn a suitable classifier is to minimize this empirical risk via gradient descent, which for learning rate $\eta>0$ generates iterates $$w_{t+1}\leftarrow w_t-\frac{\eta}{|S|}\sum_{(x,y)\in S}\nabla l(x,y;w_t). \tag{3.2}$$

Unfortunately, while this will yield a large-margin solution, the following result demonstrates that the number of iterations required may be prohibitively large.

Theorem 3.3 Let $e_i\in\mathbb{R}^{d+1}$ be the i-th standard basis vector. Consider the training set $S=\{(e_1, 1), (-e_1, -1)\}$ and the initialization $w_0=e_2$. Suppose $\{w_t\}_{t\geq 0}$ is a sequence of classifiers generated by the gradient descent updates (cf. (3.2)). Then, the number of iterations needed to achieve margin $\gamma$ is $\Omega(\exp(\gamma))$.

While this result appears disheartening, fortunately, the present disclosure presents a simple resolution: by suitably adding adversarial examples, the solution found by the gradient descent converges to a large-margin solution in polynomial time.

4. Example Techniques for Machine Learning in Hyperbolic Space with Adversarial Examples Theorem 3.3 reveals that gradient descent on a margin loss is insufficient to efficiently obtain a large-margin classifier. However, this section shows how to alleviate this problem by enriching the training set with adversarial examples before updating the classifier (cf. Algorithm 2 in FIG. 3). In particular, learning a model can include minimizing a robust loss of the following form:

$$\min_{w\in\mathbb{R}^{d+1}} L_{rob}(w;S):=\frac{1}{|S|}\sum_{(x,y)\in S} l_{rob}(x, y; w), \tag{4.1}$$

$$l_{rob}(x, y; w):=\max_{z\in\mathbb{L}^d:d_\mathbb{L}(x,z)\leq\alpha} l(z, y; w). \tag{4.2}$$

The inner optimization defined in (4.2) generates an adversarial example by perturbing a given input feature x on the hyperbolic manifold. Note that the magnitude of the perturbation added to the original example is bounded by $\alpha$, which is referred to as the adversarial budget. In particular, it is desirable to construct a perturbation that maximizes the loss, i.e., $\tilde{x}\leftarrow\text{argmax}^x_{d_\mathbb{L}(x,z)\leq\alpha}l(z,y;w)$.

The outer optimization (cf. (4.1)) can be achieved by an iterative optimization procedure, which generates a sequence of classifiers $\{w_t\}$. The classifier $w_t$ can be updated according to an update rule $\mathcal{A}$, which accepts as input the current estimate of the weight vector, the original training set, and an adversarial perturbation of the training set. The update rule produces as output a weight vector which approximately minimizes the robust loss $L_{rob}$ in (4.1).

It is now established that for a gradient based update rule, the above adversarial training procedure will efficiently converge to a large-margin solution.

4.1 Example Fast Convergence Via Gradient-Based Update

Consider Algorithm 2 with $\mathcal{A}$ ($w_t$, $S$, $S_t$) being a gradient-based update with learning rate $\eta_t>0$:

$$w_{t+1}\leftarrow w_t-\frac{\eta_t}{|S_{t'}|}\sum_{(\tilde{x},y)\in S_{t'}}\nabla_{w_t} l(\tilde{x}, y; w_t) \tag{4.3a}$$

$$w_{t+1}\leftarrow\frac{w_{t+1}}{\sqrt{-w_{t+1}*w_{t+1}}} \tag{4.3b}$$

Note that the normalization is performed to ensure that the update remains valid, i.e., $\mathbb{L}^d\cap\partial\mathcal{H}$ $c_w\neq 0$.

To compute the update, one needs to compute gradients of the outer minimization problem, i.e., $\nabla_w$, $l_{rob}$ over $S_{t'}$ (cf. (4.1)). However, this function is itself a maximization problem (cf. (4.2)). Therefore the gradient can be computed at the maximizer of this inner maximization problem. Danskin's theorem ensures that this gives a valid descent direction.

The inner maximization can be solved in closed form as:

$$l_{rob}(x, y; w)=\max_{d_\mathbb{L}(x,z)\leq\alpha} l(z, y; w)=l(\tilde{x}, y; w) \text{ with}$$

$$\tilde{x}=\left(\tilde{x}_0, \sqrt{\tilde{x}_0^2-1}\left(b\tilde{x}+\sqrt{1-b^2\tilde{x}}^\perp\right)\right),$$

where b, $\tilde{x}$, and $\tilde{x}^\perp$ are defined in Theorem 4.4. Given the closed form expression for the adversarial example $\tilde{x}$, one can compute the gradient of the loss as $$\nabla_w l(\tilde{x}, y; w) = f'(y(w * x)) \cdot \nabla_w y(w * \tilde{x}) = f'(y(w * \tilde{x})) \cdot y\hat{\tilde{x}}^T,$$

where $\nabla_w y(w * \tilde{x}) = y\hat{\tilde{x}}^T = y(\tilde{x}_0, -\tilde{x}_1, \ldots, -\tilde{x}_n)^T$. With Danskin's theorem, $\nabla l(\tilde{x}, y; w) \in \partial l_{rob}(x, y; w)$, from which one can compute the descent direction and therefore the update step.

4.1.1 Example Convergence Analysis

This subsection establishes that the above gradient-based update converges to a large-margin solution in polynomial time. For this analysis, the following assumptions are used: Assumption 1.

1. The training set $\mathcal{S}$ is linearly separable, i.e., there exists a $\overline{w} \in \mathbb{R}^{d+1}$, such that $y(\overline{w} * x) \geq 0$ for all $(x, y) \in \mathcal{S}$.

2. There exists some constant $R_x \geq 0$, such that (i) $\|x\| \leq R_x$ and (ii) all possible adversarial perturbations remain within this constraint, i.e., $\|\tilde{x}\| \leq R_x$. Furthermore, we assume $\|w\| \leq R_w$ for some constant $R_w$. Let $R_\alpha := R_x R_w$.

3. The function $f(s)$, underlying the loss (cf. (3.1)), has the following properties: (i) $f(s) > 0 \ \forall s$; (ii) $f'(s) < 0 \ \forall s$; (iii) $f$ is differentiable, and (iv) $f$ is $\beta$-smooth.

An example loss function that fulfills Assumption 1 is the following hyperbolic equivalent of the logistic regression loss:

$$l(x, y; w) = \ln\left(1 + e^{-asinh\left(\frac{y(w*x)}{2R_\alpha}\right)}\right), \tag{4.4}$$

where $R_\alpha$ is as defined in Assumption 1. The following focuses on this example choice of the loss function. Other loss functions as well as the derivation of the hyperbolic logistic regression loss can be used instead and are discussed in U.S. Provisional Patent Application No. 63/008,288.

First it is shown that Algorithm 2 with a gradient update is guaranteed to converge to a large-margin classifier.

Theorem 4.1 With constant step size and $\mathcal{A}$ being the GD update with an initialization $w_0$ with $w_0 * w_0 < 0$, $\lim_{t \to \infty} L(w_t; \mathcal{S} \cap \mathcal{S}'_t) = 0$.

The proof can be found in U.S. Provisional Patent Application No. 63/008,288. While this result guarantees convergence, it does not guarantee efficiency (e.g., by showing a polynomial convergence rate). Next, we quantify the convergence rate of Algorithm 2, showing that the algorithm with a gradient based update computes a max-margin classifier in polynomial time.

Theorem 4.2 (Convergence rate GD update, Algorithm 2) For a fixed constant $c \in (0, 1)$, let the step size $$\eta_t := \eta = c \cdot \frac{2\sinh^2(\gamma)}{\beta \sigma_{max}^2 \cosh^2(\alpha) R_\alpha^2}$$

with $\sigma_{max}$ denoting an upper bound on the maximum singular value of the data matrix, and $\mathcal{A}$ be the GD update as defined in (4.3a) and (4.3b). Then, the iterates $\{w_t\}$ in Algorithm 1 satisfy the following:

$$L_{rob}(w_r; \mathcal{S}) = O\left(\frac{\sinh^2(\ln(t))}{t} \cdot \left(\frac{\sinh(\gamma)}{\cosh(\alpha)}\right)^{-4}\right).$$

The proof of Theorem 4.2 and the accompanying auxiliary results are presented in the U.S. Provisional Patent Application No. 63/008,288.

4.2 Discussion Regarding Combining Gradient Descent and Adversarial Training It is noted here that the enrichment of the training set with adversarial examples is significantly important for the polynomial-time convergence. Recall first that by Theorem 3.3, without adversarial training, one can construct a simple max-margin problem that cannot be solved in polynomial time. Interestingly, merely using adversarial examples by themselves does not suffice for fast convergence either.

Consider Algorithm 2 with an ERM as the update rule $\mathcal{A}(_t, \mathcal{S}, \mathcal{S}')$. In this case, the iterate $w_{t+1}$ corresponds an ERM solution for $\mathcal{S} \cap \mathcal{S}'$, i.e., $$w_{t+1} \leftarrow \text{argmin}_w \sum_{(x,y) \in \mathcal{S} \cup \mathcal{S}'} l(x, y; w). \tag{4.5}$$

Let $\mathcal{S}_t = \mathcal{S}$, i.e., we utilize the full power of the adversarial training in each step. The following result reveals that even under this optimistic setting, Algorithm 2 may not converge to a solution with a non-trivial margin in polynomial time:

Theorem 4.3 Suppose Algorithm 2 (with an ERM update) outputs a linear separator of $\mathcal{S} \cap \mathcal{S}'$. In the worst case, the number of iteration required to achieve a margin at least $\varepsilon$ is $\Omega(\exp(d))$.

To prove Theorem 4.3, given a spherical code $\mathbb{R}^d$ in with T codewords and $\theta \sim \sin h(\varepsilon)\cos h(\alpha)$ minimum separation, we construct a training set $\mathcal{S}$ and subsequently the adversarial examples $\{\mathcal{S}_t\}$ such that there exists an ERM solution $w_t$ on $\mathcal{S} \cap \mathcal{S}'$ (cf. (4.5)) that has margin less than $\varepsilon$. Now the result in Theorem 4.3 follows by utilizing a lower bound on the size of the spherical code with $T = \Omega(\exp(d))$ codewords and $\theta \sim \sin h(\varepsilon)\cos h(\alpha)$ minimum separation. The detailed proof of Theorem 4.3 is presented in the U.S. Provisional Patent Application No. 63/008,288.

4.3 Example Technique for Computing Adversarial Examples

This section returns to the issue of efficiently computing the adversarial examples. Consider the certification problem: Given a classifier $w \in \mathbb{R}^{d+1}$ that defines a decision function $h_W \in \mathcal{H}$ (cf. (2.1)), a point $x \in \mathbb{L}^d$ and a budget $\alpha > 1$, can we efficiently decide whether there exists an adversarial example with $d_\mathbb{L}(x, \tilde{x}) \leq \alpha$ such that $h_w(x) \neq h_w(\tilde{x})$. Recall that some example implementations only consider those adversarial examples that lead to misclassification.

For given $(x, y)$ and $w$, recall that the adversarial example of interest is defined as follows $$\tilde{x} \leftarrow \text{argma}^x d_{\mathbb{L}(x,z) \leq \alpha} l(z, y; w).$$

For the underlying loss function (cf. (4.4)), this problem can be equivalently expressed as $$\tilde{x} = d_\mathbb{L}(x,y) \leq \alpha \ y \cdot (w * z) = \tag{4.6}$$

$$\text{argmax}_{d_\mathbb{L}(x,y) \leq \alpha} - w' * z = \text{argmax}_{d_\mathbb{L}(x,y) \leq \alpha} - w'_0 z_0 + \sum_i w'_i z_i$$

where $w' = -yw$. One can now guess $z_0$, the first coordinate of $z$ in (4.6), which reduces (4.6) to an (Euclidean) linear program with a spherical constraint:

11 12

$$(CERT) \max_{z_{\backslash 0} \in \mathbb{R}^d} \sum_i w_i' z_i$$

$$\text{s.t.} \sum_i -x_i z_i \le \cosh(\alpha) - x_0 z_0, \ \|z_{\backslash 0}^2\| = z_0^2 - 1.$$

Next, the closed-form solution for (CERT) is provided.

Theorem 4.4 Given the input example (x, y), let $x_{\backslash 0} = (x_1, \ldots, x_d)$. One can efficiently compute a solution to CERT or decide that no solution exists. If a solution exists, then based on a guess of $z_0$ a maximizing adversarial example has the form $\tilde{x} = z_0, \sqrt{z_0^2 - 1}(b\check{x} + \sqrt{1 - b^2}\check{x}^\perp))$. Here, $$b = \frac{\cosh(\alpha) - x_0 z_0}{\sqrt{x_0^2 - 1}\sqrt{z_{0-1}^2}}$$

depends on the adversarial budget $\alpha$, and $\check{x}^\perp$ is a unit vector orthogonal to $\check{x} = x_{\backslash 0}/\|x_{\backslash 0}\|$.

The proof of Theorem 4.4 is presented in U.S. Provisional Patent Application No. 63/008,288.

Note that according to Theorem 4.4, it is possible that, for a particular guess of $z_0$, one may not be able to find an adversarial example 5c'' that leads to a prediction that is inconsistent with x, i.e., $h_w(x) \ne h_w(\tilde{x})$. Thus, for some t, one may have $|S'_t| < m$ in Algorithm 2.

5. Example Discussion of Dimension-Distortion Trade-Off

So far we have focused on classifying data that are given in either Euclidean spaces $\mathbb{R}^d$ or Lorentz space $\mathbb{L}^{d'}$. Now, consider data ($\mathcal{X}$, d $\mathcal{X}$) with similarity metric d $\mathcal{X}$ that were was embedded into the respective spaces. We further assume access to maps $\phi_E: \mathcal{X} \to \mathbb{R}^d$ and $\phi_H: \mathcal{X} \to \mathbb{L}_+^{d'}$ that embed $\mathcal{X}$ into the Euclidean space $\mathbb{R}^d$ and the upper sheet of the Lorentz space $\mathbb{L}_+^{d'}$, respectively. Let $c_E$ and $c_H$ denote the multiplicative distortion induced by $\phi_E$ and $\phi_H$, respectively (cf. § 2.2). Upper bounds on $c_E$ and $c_H$ can be estimated based on the structure of $\mathcal{X}$ (e.g., tree-like) and the embedding dimensions (d and d', respectively).

How does the distortion $c_E$, $c_H$ impact our guarantees on the margin? In the previous sections, we noticed that some of the guarantees scale with the dimension of the embedding space. Therefore, we want to analyze the trade-off between the higher distortion resulting from working with smaller embedding dimensions and the higher cost of training robust models due to working with larger embedding dimensions.

Datasets are often encountered in ML applications that are intrinsically hierarchical. Theoretical results on the embeddability of trees (cf. § 2.2) suggest that hyperbolic spaces are especially suitable to represent hierarchical data. Therefore the analysis is restricted to such data. Further, the following assumptions are made on the underlying data and the embedding maps, respectively.

Assumption 2 (1) Both $\phi_H(\mathcal{X})$ and $\phi_E(\mathcal{X})$ are linearly separable in the respective spaces, and (2) $\mathcal{X}$ X is hierarchical, i.e., has a partial order relation.

Assumption 3 The maps $\phi_H$, $\phi_E$ preserve the partial order relation in X and the root is mapped onto the origin of the embedding space.

Example approaches described herein relate the distance between the support vectors to the size of the margin. The distortion of these distances via embedding then gives a bound on the error induced on the margin.

5.1 Example Euclidean Case

In the Euclidean case, one example technique is to relate the distance of the support vectors to the size of the margin via triangle relations. Let x, y, $\in \mathbb{R}^d$ denote support vectors, such that $\langle x, w \rangle > 0$ and $\rangle y, w \rangle < 0$ and margin(w)=$\varepsilon$. One can rotate the decision boundary, such that the support vectors are not unique. Without loss of generality, assume that $x_1$, $x_2$ are equidistant from the decision boundary and $\|w\|=1$. In this setting, we show the following relation between the margin with ($\varepsilon'$) and without ($\varepsilon$) the influence of distortion:

Theorem 5.1 Let $\varepsilon'$ and $\varepsilon$ denote the margin with and without distortion. Then $$\varepsilon' \ge \frac{\varepsilon}{c_E^3}.$$

Corollary 5.2 If $\mathcal{X}$ is a tree embedded into $O(\log_2 |\mathcal{X}|)$, then $$\varepsilon' = O\left(\frac{\varepsilon}{\log^3 |\chi|}\right).$$

The proof of Theorem 5.1 follows from a simple side length-altitude relation in the Euclidean triangle between support vectors (cf. FIG. 4(a)). Corollary 5.2 is then a simple application of Bourgain's result on embedding trees into $\mathbb{R}^d$.

5.2 Example Hyperbolic Case

As in the Euclidean case, one example technique is to relate the margin to the pairwise distances of the support vectors. Such a relation can be constructed both in the original and in the embedding space, which allows us to study the influence of distortion on the margin in terms of $c_H$. In the following, the half-space model $\mathbb{P}^{d'}$ (cf. § 2.1) is used. However, since the theoretical guarantees in the rest of the paper consider the Lorentz model $\mathbb{L}_+^{d'}$, it may be necessary to map between the two spaces. It is shown in the U.S. Provisional Patent Application No. 63/008,288 that such a mapping exists and preserves the Minkowski product.

The hyperbolic embedding $\phi_H$ has two sources of distortion: (1) the multiplicative distortion of pairwise distances, measured by the factor $$\frac{1}{c_H};$$

and (2) the distortion of order relations, in most embedding models captured by the alignment of ranks with the Euclidean norm. Under Assumption 0, order relationships are preserved and the root is mapped to the origin. Therefore, for $x \in \mathcal{X}$, the distortion on the Euclidean norms is given as follows:

$$\|\phi_H(x)\| = d_E(\phi_H(x), \phi_H(0)) = \frac{d_x(x, 0)}{c_H},$$

i.e., the distortion on both pairwise distances and norms is given by a factor $C_H^{-1}$.

In $\mathbb{P}^{d'}$, the decision hyperplane corresponds to a hyper-circle $\mathcal{K}_w$. We express its radius $r_w$ in terms of the hyperbolic distance between a point on the decision boundary and one of the hypercircle's ideal points. The support vectors, x,y lie on hypercircles $\mathcal{K}_x$ and $\mathcal{K}_y$, which correspond to the set of points of hyperbolic distance $\varepsilon$ (i.e., the margin) from the decision boundary. We again assume, without loss of generality, that at least one support vector is not unique and let $x_1, x_2 \in \mathcal{K}_x$ and $y \in \mathcal{K}_y$ (cf. FIG. 4B). In this setting, one can show that the influence on the margin is negligible. More formally:

Theorem 5.3 Let again $\varepsilon'$, $\varepsilon$ denote the margin with and without distortion. If $\mathcal{X}$ is a tree embedded into $\mathbb{L}_+^2$, $\varepsilon' \approx \varepsilon$.

The technical proof relies on a construction that reduces the problem to Euclidean geometry via circle inversion on the decision hypercircle.

6. Example Devices and Systems

FIG. 5A depicts a block diagram of an example computing system 100 that according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various margin-based classifiers such as large-margin classifiers. In other examples, the machine-learned models 120 can be or can otherwise include machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receive user input. For example, the one or more user input components 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include various margin-based classifiers such as large-margin classifiers. In other examples, the machine-learned models 140 can be or can otherwise include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data defined within a hyperbolic space such as, for example, data that have a hierarchical structure. The model trainer 160 can be configured to perform some or all of the algorithms or methods described herein, including Algorithms 1 and/or 2 and/or the methods of FIG. 6 and/or 7.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 5B depicts a block diagram of an example computing device 10 that performs according to example embodiments of the present disclosure. The computing device 10 can be a user computing device or a server computing device.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 5C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

7. Example Methods

FIG. 6 depicts a flow chart diagram of an example method to perform machine learning according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the method 600 can include accessing, by a computing system, a current set of weights of a machine-learned classification model and a plurality of training examples, wherein each of the plurality of training examples comprises a respective input defined within the hyperbolic space and a respective ground truth label.

In some implementations, the machine-learned classification model comprises a large-margin classification model. In some implementations, the machine-learned classification model comprises a binary classification model.

In some implementations, the hyperbolic space is modeled according to a Lorentz model. In some implementations, the hyperbolic space is modeled according to a Poincare model.

At 604, the method 600 can include accessing the next training example.

At 606, the method 600 can include generating, by the computing system, a predicted label for the respective input.

In some implementations, generating, by the computing system, the predicted label for the respective input can include determining a sign of a Minkowski product of the respective input and the current set of weights.

At 608, the method 600 can include determining whether the predicted label is different from the respective ground truth label. If different, the method can proceed to 610; if not different, the method can proceed to 614.

At 610, the method 600 can include determining, by the computing system, an intermediate set of weights for the machine-learned classification model based at least in part on the predicted label for the respective input.

At 612, the method 600 can include normalizing, by the computing system, the intermediate set of weights to obtain an updated set of weights for which a Minkowski product of the updated set of weights with itself is less than zero.

In some implementations, normalizing, by the computing system, the intermediate set of weights to obtain the updated set of weights can include, when a square root of a Minkowski product between a negative of the intermediate set of weights and the intermediate set of weights is less than one: setting, by the computing system, the updated set of weights equal to the intermediate set of weights divided by the square root of the Minkowski product between the negative of the intermediate set of weights and the intermediate set of weights.

At 614, the method 600 can include determining whether additional training examples remain. If additional examples remain, the method can return to 604; if additional examples do not remain, the method can proceed to 616.

At 616, the method 600 can include outputting, by the computing system, the updated set of weights for the machine-learned classification model.

FIG. 7 depicts a flow chart diagram of an example method to perform machine learning according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include accessing, by a computing system comprising one or more computing devices, a current set of weights of the machine-learned classification model and a plurality of training examples, wherein each of the plurality of training examples comprises a respective input defined within the hyperbolic space and a respective ground truth label.

In some implementations, the machine-learned classification model comprises a large-margin classification model. In some implementations, the machine-learned classification model comprises a binary classification model.

In some implementations, the hyperbolic space is modeled according to a Lorentz model. In some implementations, the hyperbolic space is modeled according to a Poincare model.

At 704, the method 700 can include identifying, by the computing system, one or more adversarial training examples respectively for one or more of the plurality of training examples. In some implementations, for each of the one or more of the plurality of training examples, the respective adversarial training example comprises an alternative input that, among all possible inputs that are contained in the hyperbolic space and that have a respective distance to the input of the training example that is less than an adversarial budget, maximizes a loss function that evaluates an output of machine-learned classification model.

In some implementations, for each possible input contained in the hyperbolic space, the respective distance to the input of the respective training example is based at least in part on a Minkowski product between the possible input and the input of the respective training example.

At 706, the method 700 can include determining, by the computing system, an updated set of weights for the machine-learned classification model based at least in part on at least one of the one or more adversarial training examples.

In some implementations, determining, by the computing system, the updated set of weights for the machine-learned classification model based at least in part on the at least one of the one or more adversarial training examples can include performing a gradient descent technique with respect to the loss function.

In some implementations, the loss function comprises a margin loss function that evaluates a Minkowski product between the current set of weights and the respective input.

In some implementations, determining, by the computing system, the updated set of weights for the machine-learned classification model based at least in part on the at least one of the one or more adversarial training examples can include: determining, by the computing system, an intermediate set of weights for the machine-learned classification model based at least in part on the at least one of the one or more adversarial training examples; and normalizing, by the computing system, the intermediate set of weights to obtain the updated set of weights such that a Minkowski product of the updated set of weights with itself is less than zero.

In some implementations, normalizing, by the computing system, the intermediate set of weights to obtain the updated set of weights can include: setting, by the computing system, the updated set of weights equal to the intermediate set of weights divided by a square root of a Minkowski product between a negative of the intermediate set of weights and the intermediate set of weights.

At 708, the method 700 can include outputting, by the computing system, the updated set of weights for the machine-learned classification model.

8. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to learn a machine-learned classification model in a hyperbolic space using training data enriched with one or more adversarial training examples, the method comprising, for at least one of one or more training iterations:

accessing, by a computing system comprising one or more computing devices, a current set of weights of the machine-learned classification model and a plurality of training examples, wherein each of the plurality of training examples comprises a respective input defined within the hyperbolic space and a respective ground truth label;

enriching, by the computing system, the training data with the one or more adversarial training examples respectively for one or more of the plurality of training examples, wherein, for each respective training example of the one or more of the plurality of training examples, a corresponding respective adversarial training example of the one or more adversarial training examples comprises an alternative input that, among all possible inputs that are contained in the hyperbolic space and that have a respective distance to the input of the training example that is less than an adversarial budget, maximizes a loss function that evaluates an output of machine-learned classification model; and training, by the computing system, the machine-learned classification model using the training data enriched with the one or more adversarial training examples, the training comprising:

inputting, by the computing system, at least one of the one or more adversarial training examples and at least one of the plurality of training examples to the machine-learned classification model to generate training outputs;

performing, by the computing system, gradient descent based on the training outputs;

determining, by the computing system, an updated set of weights for the machine-learned classification model based at least in part on the gradient descent; and outputting, by the computing system, the updated set of weights for the machine-learned classification model.

2. The computer-implemented method of claim 1, wherein the machine-learned classification model comprises a large-margin classification model.

3. The computer-implemented method of claim 1, wherein the machine-learned classification model comprises a binary classification model.

4. The computer-implemented method of claim 1, wherein, for each possible input contained in the hyperbolic space, the respective distance to the input of the respective training example is based at least in part on a Minkowski product between the possible input and the input of the respective training example.

5. The computer-implemented method of claim 1, wherein determining, by the computing system, the updated set of weights for the machine-learned classification model based at least in part on the at least one of the one or more adversarial training examples comprises performing a gradient descent technique with respect to the loss function.

6. The computer-implemented method of claim 1, wherein determining, by the computing system, the updated set of weights for the machine-learned classification model based at least in part on the at least one of the one or more adversarial training examples comprises:

determining, by the computing system, an intermediate set of weights for the machine-learned classification model based at least in part on the at least one of the one or more adversarial training examples; and normalizing, by the computing system, the intermediate set of weights to obtain the updated set of weights such that a Minkowski product of the updated set of weights with itself is less than zero.

7. The computer-implemented method of claim 6, wherein normalizing, by the computing system, the intermediate set of weights to obtain the updated set of weights comprises:

setting, by the computing system, the updated set of weights equal to the intermediate set of weights divided by a square root of a Minkowski product between a negative of the intermediate set of weights and the intermediate set of weights.

8. The computer-implemented method of claim 1, wherein the loss function comprises a margin loss function that evaluates a Minkowski product between the current set of weights and the respective input.

9. The computer-implemented method of claim 1, wherein the hyperbolic space is modeled according to a Lorentz model.

10. The computer-implemented method of claim 1, wherein the hyperbolic space is modeled according to a Poincare model.

11. One or more non-transitory computer-readable media that collectively store a machine-learned classification model that has been trained by performance of operations, the operations comprising:

accessing, by a computing system comprising one or more computing devices, a current set of weights of the machine-learned classification model and a plurality of training examples, wherein each of the plurality of training examples comprises a respective input defined within hyperbolic space and a respective ground truth label;

enriching, by the computing system, the plurality of training examples with one or more adversarial training examples respectively for one or more of the plurality of training examples, wherein, for each respective training example of the one or more of the plurality of training examples, a corresponding respective adversarial training example of the one or more adversarial training examples comprises an alternative input that, among all possible inputs that are contained in the hyperbolic space and that have a respective distance to the input of the training example that is less than an adversarial budget, maximizes a loss function that evaluates an output of machine-learned classification model; and training, by the computing system, the machine-learned classification model using the plurality of training examples enriched with the one or more adversarial training examples, the training comprising:

inputting, by the computing system, at least one of the one or more adversarial training examples and at least one of the plurality of training examples to the machine-learned classification model to generate training outputs;

performing, by the computing system, gradient descent based on the training outputs;

determining, by the computing system, an updated set of weights for the machine-learned classification model based at least in part on the gradient descent; and outputting, by the computing system, the updated set of weights for the machine-learned classification model.

12. The one or more non-transitory computer-readable media of claim 11, wherein the machine-learned classification model comprises a large-margin classification model.

13. The one or more non-transitory computer-readable media of claim 11, wherein the machine-learned classification model comprises a binary classification model.

14. The one or more non-transitory computer-readable media of claim 11, wherein, for each possible input contained in the hyperbolic space, the respective distance to the input of the respective training example is based at least in part on a Minkowski product between the possible input and the input of the respective training example.

15. The one or more non-transitory computer-readable media of claim 11, wherein determining, by the computing system, the updated set of weights for the machine-learned classification model based at least in part on the at least one of the one or more adversarial training examples comprises performing a gradient descent technique with respect to the loss function.

16. A computing system for performing machine learning in hyperbolic space to generate a valid hyperbolic classification model having a feature space separable by a valid decision boundary, the system comprising:

one or more processors; and one or more non-transitory computer-readable media that collectively store instructions that, when executed by the one or more processors cause the computing system to perform operations, the operations comprising, for at least one of one or more training iterations:

accessing, by the computing system, a current set of weights of a machine-learned classification model and a plurality of training examples, wherein each of the plurality of training examples comprises a respective input defined within the hyperbolic space and a respective ground truth label;

generating, by the computing system, predicted labels for the plurality of training examples;

determining, by the computing system, an intermediate set of weights for the machine-learned classification model based at least in part on the predicted labels;

generating, by the computing system, a valid update to the current set of weights such that the feature space remains separable by an updated decision boundary, the valid update based on normalizing, by the computing system, the intermediate set of weights to obtain a valid updated set of weights for which a Minkowski product of the updated set of weights with itself is less than zero; and outputting, by the computing system, the updated set of weights for the machine-learned classification model.

17. The computing system of claim 16, wherein normalizing, by the computing system, the intermediate set of weights to obtain the updated set of weights comprises, when a square root of a Minkowski product between a negative of the intermediate set of weights and the intermediate set of weights is less than one:

setting, by the computing system, the updated set of weights equal to the intermediate set of weights divided by the square root of the Minkowski product between the negative of the intermediate set of weights and the intermediate set of weights.

18. The computing system of claim 16, wherein the operations further comprise:

identifying, by the computing system, one or more adversarial training examples respectively for one or more of the plurality of training examples, wherein, for each of the one or more of the plurality of training examples, the respective adversarial training example comprises an alternative input that, among all possible inputs that are contained in the hyperbolic space and that have a respective distance to the input of the training example that is less than an adversarial budget, maximizes a loss function that evaluates an output of machine-learned classification model; and adding, by the computing system the one or more adversarial training examples to the plurality of training examples.

19. The computing system of claim 16, wherein generating, by the computing system, the predicted label for the respective input comprises determining a sign of a Minkowski product of the respective input and the current set of weights.

20. The computing system of claim 16, wherein the machine-learned classification model comprises a large-margin classification model.

* * * * *